UNITED STATES PATENT OFFICE 2,640,835

α-(2-THIENYL)BENZYLUREAS AND METHODS FOR PRODUCING THE SAME

Robert Duschinsky, Essex Fells, N. J., assignor to Hoffmann-La Roche Inc., Nutley, N. J., a corporation of New Jersey No Drawing. Application April 27, 1950, Serial No. 158,599

12 Claims. (Cl. 260—332.2)

This invention relates to α-(2-thienyl)benzylureas and to methods for preparing the same. The new compounds can be represented by the following formula:

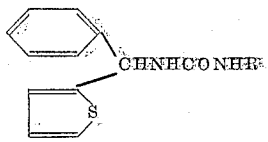

wherein R stands for hydrogen, lower alkyl, or lower aliphatic carboxylic acyl radicals. Compounds of the present invention are useful as anticonvulsants and analgesics.

The simplest member of the new class of compounds, namely, α-(2-thienyl)benzylurea, can be prepared by reacting an α-(2-thienyl)benzylamine acid addition salt, e. g., the hydrochloride, with a salt of cyanic acid, e. g., potassium cyanate. It can also be prepared by reacting the free base, α-(2-thienyl)benzylamine, with nitrourea. When α-(2-thienyl)benzylamine is reacted with a lower alkyl isocyanate, e. g., methyl isocyanate, there is obtained a 1-lower alkyl-3-[α-(2-thienyl)-benzyl]urea. The reactions may be carried out in the presence of any suitable diluent. By acylating α-(2-thienyl)benzylurea with a lower aliphatic carboxylic acyl halide, e. g., acetyl chloride, propionyl chloride, or the like, in the presence of an acid binding agent, e. g., pyridine, there is obtained a 1-lower aliphatic carboxylic acyl-3-[α-(2-thienyl)benzyl]urea.

The α-(2-thienyl)benzylamine and the salts thereof, e. g., the hydrochloride, are new compounds and can in general be obtained by reacting phenyl 2-thienyl ketone with formamide to form N-[α-(2-thienyl)benzyl]formamide, and hydrolyzing the latter with alcoholic hydrochloric acid to produce α-(2-thienyl)benzylamine hydrochloride. To obtain the free base, the salt is reacted with an alkaline agent, e. g., sodium hydroxide. The base can be converted to any desired salt by the usual methods well known in the art.

The following example will serve to illustrate the preparation of α-(2-thienyl)benzylamine and the acid addition salts thereof.

EXAMPLE A

A mixture of 110 cc. of 28 per cent ammonia and 75 cc. of 90 per cent formic acid was heated to 160° C. until the water was distilled off. To the formamide thus formed 71 grams of phenyl 2-thienyl ketone were added. The mixture was heated for 7 hours at 170–190° C. until it had become homogeneous. Upon cooling, crystals formed, which were filtered and washed with xylene. The crude N-[α-(2-thienyl)benzyl]formamide thus formed was recrystallized from 125 cc. of xylene and then from a mixture of 100 cc. of methanol and 80 cc. of water. Upon further recrystallization from xylene it melted at 83–84° C.

A mixture of 22.37 grams of N-[α-(2-thienyl)-benzyl]formamide, 75 cc. of ethanol and 75 cc. of concentrated (37 per cent) hydrochloric acid was heated in a water bath for 20 minutes at 60° C. The resulting mixture was evaporated to dryness and the residue was taken up with ethanol, which was then evaporated. The final residue was dissolved in 100 cc. of warm methanol and the resulting solution filtered. Upon addition of ether to the filtrate, crystals of α-(2-thienyl)benzylamine hydrochloride formed which were filtered off and washed with ether. The hydrochloride melted with decomposition at about 225° C.

20 grams of α-(2-thienyl)benzylamine hydrochloride were treated with 25 cc. of water and 10 cc. of a 40 per cent aqueous sodium hydroxide solution. An oil separated which was extracted with 55 cc. of benzene. The benzene solution was dried over sodium sulfate and fractionally distilled in vacuo. The free base, α-(2-thienyl)-benzylamine, was collected at 174–176° C./15 mm. as an oil of the refractive index $n_D^{27°} = 1.607$.

The following examples will serve to illustrate the preparation of the new α-(2-thienyl)benzylureas.

EXAMPLE 1

α-(2-thienyl)benzylurea

A filtered solution of 3.78 grams of α-(2-thienyl)benzylamine hydrochloride in 40 cc. of 50 per cent methanol was mixed with a solution of 1.92 grams of potassium cyanate in 10 cc. of water. After heating the mixture for 15 minutes on the steam bath and cooling, the crystals which separated were filtered and washed with water. After recrystallization from 10 volumes of xylene, the α-(2-thienyl)benzylurea thus obtained melted at 132–133° C.

EXAMPLE 2

α-(2-thienyl)benzylurea

To a solution of 1.91 grams of distilled α-(2-thienyl)benzylamine in 5 cc. of dioxane and 1 cc. of water there was added 1.22 grams of nitrourea. A solid material formed immediately. Upon addition of 5 cc. of dioxane and 5 cc. of water, and heating for 10 minutes on the water bath, the solid material dissolved with some effervescence. Upon cooling and addition of water, α-(2-thienyl)benzylurea crystallized. It was filtered, washed with water and with Dry Ice cooled methanol. After recrystallization from 10 volumes of xylene, the compound melted at 131–132° C.

EXAMPLE 3

*1-methyl-3-[α-(2-thienyl)benzyl]urea*

To a solution of 1 cc. of methyl isocyanate in 2 cc. of benzene there was added a solution of 1.89 grams of α-(2-thienyl)benzylamine in 20 cc. of benzene. After refluxing the mixture for 25 minutes and cooling, the crystals which formed were filtered off and washed with benzene and petrol ether. The melting point of the 1-methyl-3-[α-(2-thienyl)benzyl]urea thus obtained, after recrystallization from 10 volumes of toluene, was 169–170° C.

EXAMPLE 4

*1-acetyl-3-[α-(2-thienyl)benzyl]urea*

A mixture of 3.21 grams of α-(2-thienyl)benzylurea, 20 cc. of pyridine and 1.1 cc. of acetyl chloride was refluxed for 45 minutes. After adding 40 grams of ice and 20 cc. of concentrated hydrochloric, crystals formed which were filtered and washed with water and with Dry-Ice cooled methanol. After two recrystallizations from methanol, the 1-acetyl-3-[α-(2-thienyl)benzyl]urea thus obtained melted at 125–126° C.

EXAMPLE 5

*1-propionyl-3-[α-(2-thienyl)benzyl]urea*

A mixture of 1.16 grams of α-(2-thienyl)benzylurea, 4 cc. of pyridine and 1 cc. of propionyl chloride was refluxed for one hour. After cooling and adding 10 cc. of water and 5 cc. of 20 per cent hydrochloric acid, crystals formed which were washed with water and with Dry-Ice cooled methanol. The crude material was recrystallized from 4 cc. of methanol. Upon a second recrystallization from 5 cc. of toluene and 12 cc. of petrol ether, the 1-propionyl-3-[α-(2-thienyl)benzyl]urea thus obtained melted at 111–113° C.

I claim:

1. A compound of the following formula:

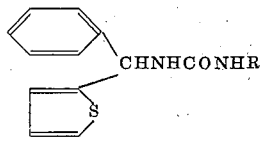

wherein R is a member of the group consisting of hydrogen, lower alkyl, and lower aliphatic carboxylic acyl radicals.

2. α-(2-thienyl)benzylurea.
3. 1-methyl-3-[α-(2-thienyl)benzyl]urea.
4. 1-acetyl-3-[α-(2-thienyl)benzyl]urea.
5. 1-propionyl-3-[α-(2-thienyl)benzyl]urea.
6. The process which comprises reacting an α-(2-thienyl)benzylamine acid addition salt with a salt of cyanic acid to obtain α-(2-thienyl)benzylurea.
7. The process according to claim 6, wherein α-(2-thienyl)benzylamine hydrochloride and potassium cyanate are employed in the reaction.
8. A process as in claim 6, wherein the α-(2-thienyl)benzylurea is acylated to form 1-lower aliphatic carboxylic acyl-3-[α-(2-thienyl)benzyl]urea.
9. A process as in claim 8, wherein the acylating agent is acetyl chloride.
10. A process as in claim 8, wherein the acylating agent is propionyl chloride.
11. A process which comprises reacting α-(2-thienyl)benzylamine with a lower alkyl isocyanate to obtain a 1-lower alkyl-3-[α-(2-thienyl)-benzyl]urea.
12. A process as in claim 11 wherein the lower alkyl isocyanate is methyl isocyanate.

ROBERT DUSCHINSKY.

References Cited in the file of this patent

UNITED STATES PATENTS

| Number | Name | Date |
|---|---|---|
| 2,560,522 | Duschinsky | July 10, 1951 |

FOREIGN PATENTS

| Number | Country | Date |
|---|---|---|
| 472,211 | France | July 30, 1914 |

OTHER REFERENCES

Alles: J. Pharm. and Exp. Ther., vol. 72, p. 265 (1941).

Caesar and Sacharren: Ind. and Eng. Chem., vol. 40, p. 922 (Mar. 1948).

Bernthsen and Sudborough: "Organic Chemistry," Van Nostrand (N. Y.), 1925. (1922 Ed.), page 549.

Powers: "Advancing Fronts in Chemistry," vol. II, p. 33, Reinhold (46).

Lands: Proc. Soc. Exp. Bio. and Med., vol. 57, pp. 55–56 (1944).

Richter: "Organic Chemistry," Wiley, 1938, pp. 649–650.

Whitmore: "Organic Chemistry," Van Nostrand (1937), pp. 884 and 893.

Lew and Noller: J. Am. Chem. Soc., p. 5715 (1950).

LeSuer: "3-substituted Thiophenes," Jan. 1948, Doctor's Thesis (QD1000L644), Dept. of Chem., Indiana Univ. (page 2).

Richter's Organic Chemistry, vol. 3, page 92, Ed. 3, Elsevier, N. Y., 1946.

Williams: Detoxication Mechanisms, Wiley, N. Y., 1947, page 194.